April 17, 1951      F. M. AMOS      2,549,154
BALL BEARING MOUNTING
Filed Sept. 29, 1947
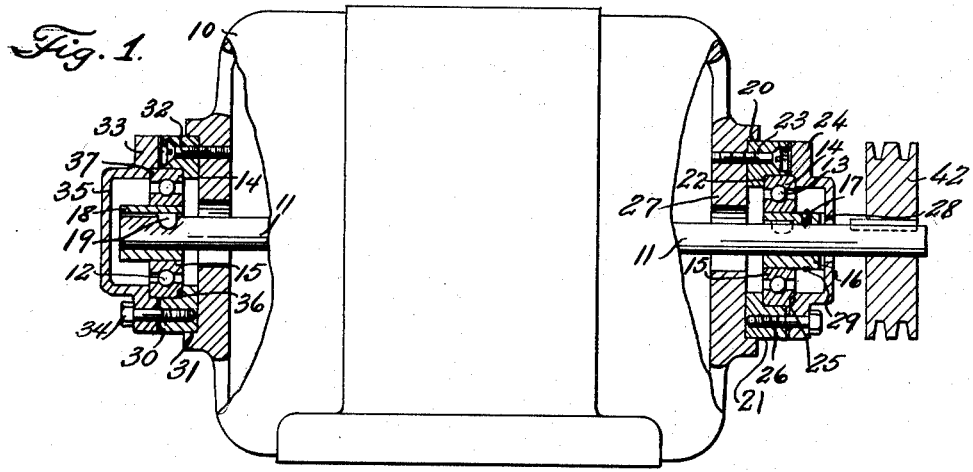
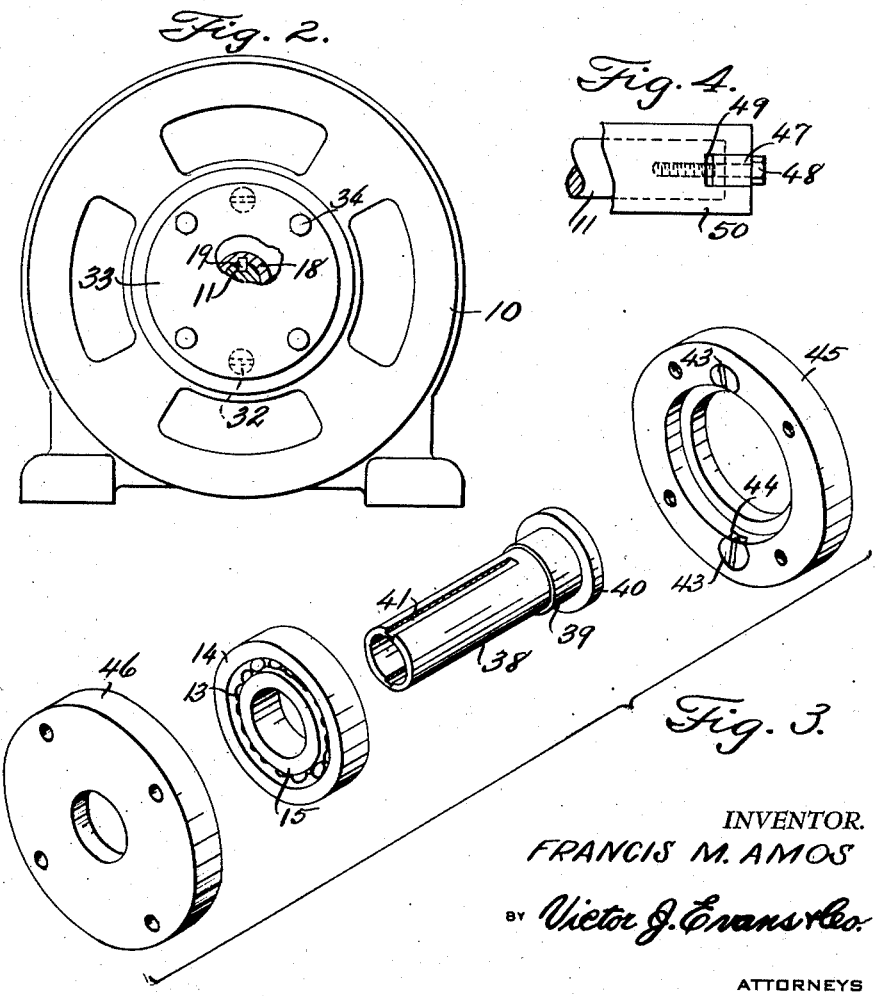
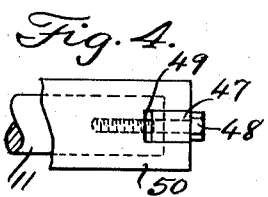
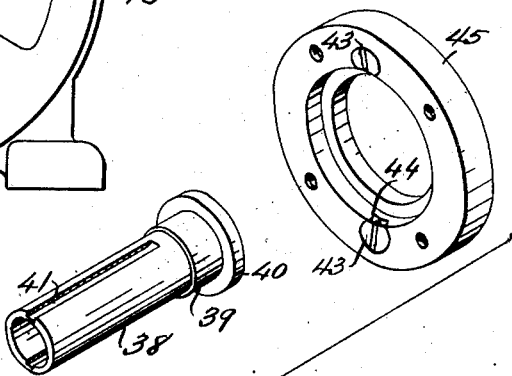
INVENTOR.
FRANCIS M. AMOS
BY Victor J. Evans & Co.
ATTORNEYS Patented Apr. 17, 1951

2,549,154

UNITED STATES PATENT OFFICE 2,549,154

BALL-BEARING MOUNTING

Francis M. Amos, Wheeling, W. Va.

Application September 29, 1947, Serial No. 776,808

1 Claim. (Cl. 308—178)

This invention relates to mountings for bearings particularly where the bearings receive hard service and wear rapidly and often wear the shaft on which the inner race of the bearing is mounted, and in particular the invention embodies the combination of a ball bearing having inner and outer races with balls between the races and an inner bushing secured in the inner race that may be machined to compensate for wear, or that may be provided with a fixed bore wherein shafting may be made or machined to fit the bushing.

The purpose of this invention is to minimize bearing failures and time lost in replacing bearings by changing machinery and eqpipment and particularly the ends of the housings of motors and the like so that over-sized bearings may be used with the bores thereof bushed to the shaft size.

It is a common occurrence for bearings such as bearings of small motors and the like to fail early because of some unexpected service demand that exceeds the capacity of the bearing, or because of inefficient lubrication or neglect. Bearing failures or even excessive wear in bearings causes damage to the armature shaft and field windings of a motor. With this thought in mind this invention contemplates the use of an over-size bearing with a bushing secured in the bore of the inner race wherein the bushing may readily be replaced, and the bearing or inner race thereof and bushing assembly is removable for inspection or replacement if found necessary.

The object of this invention is to provide greater bearing capacity and greater ruggedness in bearings in order to insure against bearing failure so that the life, usefulness, and continuous performance of equipment may be increased.

Another object of the invention is to provide a mounting for a bearing wherein over-size bearings may be used to replace worn bearings in discarded machinery and equipment thereby making it possible to recondition equipment otherwise considered useless.

Another object of the invention is to provide a bearing mounting having longitudinal play therein thereby compensating for expansion and contraction of a shaft, housing, or other associated parts.

A further object of the invention is to provide a mounting for bearings so that over-size bearings may be used in motors and other equipment in which the bearing assembly is comparatively simple and economical.

With the foregoing and other objects in view which will appear as the description proceeds the invention resides in the combination and arrangement of parts and in the details of construction hereinafter described and claimed. In the accompanying drawings forming part of this specification:

Figure 1 is a view showing a side elevation of a motor with the bell housing at the ends broken away illustra:ing a ball bearing mounting with the inner race of the bearing mounted on a bushing, and wherein the broken away parts are shown in section.

Figure 2 is a view showing an end elevation of a motor with part broken away showing a bearing with a bushing keyed to the shaft.

Figure 3 is an exploded view illustrating a bearing with the mounting elements associated therewith, showing a modification wherein the outer end of the bushing or sleeve is extended along the shaft so that a pulley or the like may be mounted thereon.

Figure 4 shows a further modification wherein a key is provided on the end of the shaft.

Referring now to the drawings wherein like reference characters indicate corresponding parts the improved bearing mounting of this invention is illustrated as incorporated in a motor 10 having a shaft 11 with ball bearings 12 and 13 rotatably moun:ed on the shaft in the bell ends of the motor housing.

In this type of mounting ball bearings of the usual type commonly known as radial type bearings having outer races 14 and inner races 15 are used and in the driving end of the motor the inner race of the bearing is mounted by a press fit on a bushing 16 and the bushing is secured to the shaft by a set screw 17. The bushing is bored to fit the shaft, or the shaft may be machined to fit a bushing with a fixed bore, and the bushing and bearing may be removed and replaced as a unit. Excessive wear or overloading, therefore, does not affect the shaft and the bushing may be removed and replaced or rebored.

At the opposite end of the motor housing the bearing is mounted on a bushing 18 and the bushing is keyed to the motor shaft by a key 19, of the Woodruff type.

To install the bearings the usual bosses are removed from the ends of the motor housing and at the driving end a counter-bore 20, concentric with the axis of the shaft, is provided and a flange 21, with an annular recess 22 is secured in the counter-bore by screws 23. An outer flange 24 also having an annular recess 25 which corresponds with the recess 22 is secured to the flange 21 by screws 26 and the outer race of the ball bearing is positioned with the edges thereof in the recesses 22 and 25. The inner face of the flange 21 is provided with a web 27 and the outer face of the flange 24 is also provided with a web 28, and the webs are bored to receive the motor shaft as illustrated. This provides a substantially enclosed grease pocket around the bearing and with the set screw secured by a spring wire 29 the bearing will wear indefinitely.

The ball bearing in the opposite end of the motor is mounted in a similar combination of flanges wherein the inner side is held in a flange 30 positioned in a counter-bore 31 and held by screws 32. The outer edge is held in a flange 33 which is clamped against the outer race of the bearing and to the flange 30 by screws 34, and the outer flange 33 is provided with a web 35 providing a closure for the outer end of the bearing pocket and motor housing. The flanges 30 and 33 are provided with annular recesses 36 and 37 in which the edges of the outer race of the bearing are positioned.

The bushing 38, illustrated in Figure 3, is formed with an enlarged part 39 that is machined to receive the inner race of a bearing with a press fit and a collar 40 is provided at the end as a stop to locate the bearing. The collar 40 may be of any suitable size and may be positioned on either side of the bearing. The bushing is provided with a keyway 41 that extends through the wall thereof so that it may be keyed to the shaft to prevent the bushing turning on the shaft, although with the bushing having metal to metal contact with the shaft it may slide longitudinally to compensate for expansion and contraction of the shaft or housing. A pulley 42 is shown in Figure 1 mounted on the outer end of the shaft, and in the modification shown in Figure 3 the pulley would be mounted on the outer end of the bushing and keyed to the shaft through the keyway in the bushing.

The bushing may therefore, be short or long or of any suitable design, and may be used at both ends of the housing or may only be used at the driving end of the motor, or used at either end to replace a worn bearing or to obtain a usable fit with a worn or modified shaft.

The bearing mounting is illustrated as used on a motor and it will be understood that it may be used on a machine or on or in combination with equipment of any other type, and the bearing mounting flanges may be attached by counter-boring the ends, or by bolting the flanges directly to the housing, frames, or other parts of the machines or equipment, or the bearings may be mounted directly in the housing or other machine parts.

It will also be understood that the depth of the recesses for the outer race of the bearing may be equal in both flanges or the recess in one flange may be greater than that in the other as may be desired. The inner faces of the flanges are separated so that the bolts or screws of the outer flange clamp the outer race between the flanges. The heads 43 of the screws of the inner flange are covered by the outer flange which prevents the screws working out, and the heads 43 may also be formed with arcuate sides 44, as shown in the flange 45 in Figure 3, which will engage the outer surface of the outer race of the bearing to prevent the screws working loose from vibrations of the motor or machine. The outer flange 46 of the design shown in Figure 3 is similar to that shown in Figure 1 except that the bore is larger to accommodate the bushing.

The bearing is described as mounted on the bushing by a press fit, however, it will be understood that the bearing may be secured to the bushing by any suitable means. The bushing may also be secured to the shaft by a set screw or key and the key or keyway therefor may be of any type or design. The key may extend along the shaft as shown in Figure 3 or a straight key 47 may be secured to the end of the shaft by a bolt 48 with the ends extending for sliding engagement in slots 49 of a bushing 50 as shown in Figure 4.

The bearing assembly includes an inner flange, an outer flange, a bushing or sleeve, and a bearing with the inner race thereof secured to the bushing or sleeve and with the outer race thereof clamped between the flanges. The device may be used on new machines or equipment or for replacement where shafts or bearings are worn.

It will be understood that other modifications may be made in the design or arrangement of the parts without departing from the spirit of the invention.

What is claimed is:

In a bearing mounting for the shaft of a motor having a housing with a shaft carried by ball bearings in the ends of the housing, said housing having counter-bores in the outer surfaces of the ends concentric with the shaft, flanges with bores for the shaft and having annular recesses to receive the edges of bearings positioned in the counter-bores of the housing, means securing the flanges to the housing, a complementary flange at one end of the housing having a bore for the shaft and having an annular recess for the bearing, a complementary flange at the opposite end of the housing having a continuous web on one side and having an annular recess for the bearing in the other side, means securing the complementary flanges to the former flanges, a bushing having a bore for the shaft secured in the bearing, and means securing the bushing to the shaft.

FRANCIS M. AMOS.

REFERENCES CITED

The following references are of record in the file of this patent:

UNITED STATES PATENTS

| Number | Name | Date |
|---|---|---|
| 1,296,021 | Tidmarsh | Mar. 4, 1919 |
| 1,557,569 | Eames | Oct. 20, 1925 |
| 1,590,181 | Brunner | June 29, 1926 |
| 1,697,050 | Delaval-Crow | Jan. 1, 1929 |
| 2,105,437 | Hansen | Jan. 11, 1938 |